June 20, 1967 P. PRINCEVALLE 3,326387
PORTABLE LID HOLDER

Filed April 20, 1965 2 Sheets-Sheet 1

Peter Princevalle
INVENTOR.

BY Llewellyn A. Young
His Attorney

June 20, 1967 P. PRINCEVALLE 3,326387
PORTABLE LID HOLDER

Filed April 20, 1965 2 Sheets-Sheet 2

Peter Princevalle
INVENTOR.

BY Llewellyn A. Young
His Attorney

United States Patent Office 3,326,387
Patented June 20, 1967

3,326,387
PORTABLE LID HOLDER
Peter Princevalle, 5 E. Quail St., Sparks, Nev. 89431
Filed Apr. 20, 1965, Ser. No. 449,464
1 Claim. (Cl. 211—41)

ABSTRACT OF THE DISCLOSURE

This invention pertains to a lid holder that can be readily carried about, and placed on any smooth surface, such as adjacent a cooking vessel and used to hold lids while a person is temporarily examining the contents of the cooking vessel. The holder also provides for the collection of condensate when the lid is in the holder.

---

This invention relates to a lid or cover holder.

What to do with a lid of a pot or pan during a cooking operation has always presented a problem to a busy housewife or cook. No completely satisfactory way of taking care of a hot lid has heretofore been demonstrated. In general the busy housewife carries the lid to a drainboard, frequently many steps away from the cooking area, or leaves the lid on a cold portion of the stove. This has the disadvantage that when the lid is carried to the drainboard the condensate that forms on the lid drips onto the floor and creates both a mess and a hazard. When the lid is left on the stove, the condensate drips onto the stove and frequently leaves a stain or requires severe scrubbing to remove the residue of the condensate. In some cases the cook simply holds the lid. The disadvantage in this, of course, is that at least one of the cook's hands is tied up and the cook's effectiveness is thus minimized.

One of the objects of this invention is the provision of a novel device for holding a lid that is readily portable and, consequently, can be quickly and easily used in any desired location.

Another object of the invention is the provision of a novel device for holding a lid that also has provision for the reception of the condensate formed on the lid.

Another object of the invention is the provision of a novel lid holder that is easily portable and that will readily support most conventional shapes of lids whether having an outer peripheral flange or a bead or other shape.

Another object of the invention is the provision of a novel lid holder that is rugged, that is easy to use, and that is inexpensive to produce.

Other objects and advantages of the invention will become apparent from the following detailed description taken in connection with the accompanying drawings in which.

Figure 1:
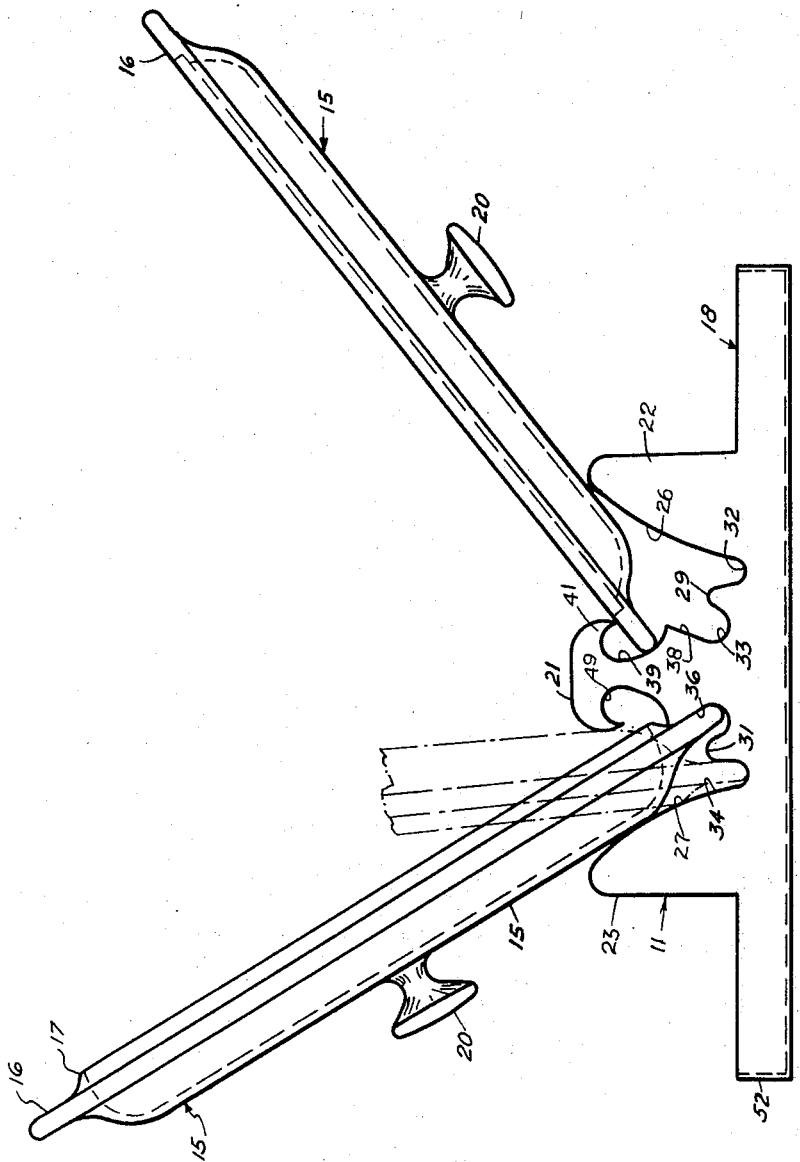
FIGURE 1 is a side view of one form of a lid holder embodying the present invention.
Figure 2:
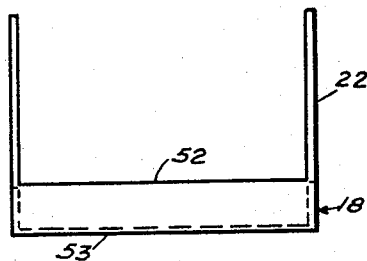
FIGURE 2 is an end view of the construction shown in FIGURE 1 without any lids.

Referring now to the drawings, the invention is shown embodied in a lid holder 11 capable of supporting, in a generally vertical position, lids 15 of the type commonly used in covering baking glassware. In general this lid is round and has a wide peripheral edge 16 adapted to seat flush on the top of the portion of the baking dish, not shown, with which it is used, and a depending flange 17 shaped to seat inside the baking dish and coact therewith to secure the lid on the dish, and a knob 20 for manually grasping the lid.

As shown, the lid holder comprises a base or body portion 18 having a pocket or recess 19 to receive condensate, upstanding projections 21 on opposite sides of the body and extending above the base, shoulders or projections 22 on opposite sides of the body and spaced from the shoulders 21 and shoulders 23 on opposite sides of the body and also spaced from the shoulders 21. As shown, the shoulders 21, 22 and 23 on each side of the body lie in a common plane and both sides are constructed in the same manner. Accordingly, only the side shown in FIGURE 1 is described in detail, it being understood that the other side is an exact duplicate of the side described.

The shoulders 21 and 22 are spaced apart a sufficient distance to form an upwardly facing slot 26 for the reception of the lid. In a similar manner the shoulders 21 and 23 are spaced apart a sufficient distance to form an upwardly facing slot 27 for the reception of a lid. It is to be understood that either pair of slots 26 or 27 may be used independently of the other so that either one or two lids may be held simultaneously with the embodiment shown in FIGURES 1–4. As is also apparent, one end of this holder is a mirror image of the other end.

As best seen in FIGURE 1, the shoulders 22 and 23 do not have to have any particular shape so long as they provide a rest for the lids when they are received in the slots 26 and 27. As shown, the shoulders 22 and 23 are arched and inclined away from the projection 21. The height of the shoulders 22 and 23 should be such that the lid rests on the shoulders at a position above the extreme outer edge of the lid. It is readily seen that if the shoulders 22 and 23 are too low that the weight of the lid could have a tendency to tip the holder. It is also seen that if the shoulders are too high, the holder will not be as readily portable as desired. There is nothing critical about the size or shape of the shoulders and a great deal of latitude is available to the designers.

The peripheral edges of lids may terminate in beads, flanges or other contours. Provision is made in this embodiment to hold not only different diameters of lids but also different shapes of edges. To this end, small bosses or projections 29 and 31 are disposed in the valleys of the slots 26 and 27, respectively. The boss 29 defines recesses 32 and 33 in the slot 26 and the boss 31 defines recesses 34 and 36 in the slot 27. The recesses 32 and 33 in effect form cradles for receiving the extreme peripheral edge of a lid. The boss 29 also serves to positively hold the lid in the recess 32 in an inclined position against the rest 22 when the lid is in the slot 26. When the peripheral edge of the lid is received in the recess 33, a side wall 38 of the slot 26 holds the lid in position against the rest 22.

As best seen in FIGURE 1, a portion of the side wall 38 is removed adjacent the top of the shoulder 21 to define a recess 39 opening into the slot 26 and a shoulder 41. The recess 39 is shaped to receive a beaded edge or the outer edge 16 of the lid as shown. The shoulder 41 serves to engage the lid and hold the latter in position on the rest 22.

In a similar manner the recesses 34 and 36 form cradles for the edges of lids and the boss 31 holds or retains the lid in the recess 34 when the lid rests on the shoulder 23. When the lid is received in the recess 36, a side wall 48 of the slot 27 holds the lid in position against the rest. Also, a portion of the side wall 48 is removed adjacent the top of the shoulder 21 to define a recess 49, opening into the slot 27, and a shoulder 51 in a manner and for the purpose described hereinbefore for the recess 39 and shoulder 41.

The pocket or recess 19 in this instance is formed by a rim 52 extending around the edge of a flat bottom member 53. The rim need only be high enough to form a small reservoir for the collection of condensate.

Figure 5:
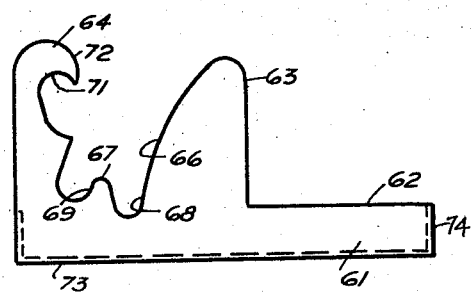
FIGURE 5 is a side view of a modified form of the invention.
Figure 3:
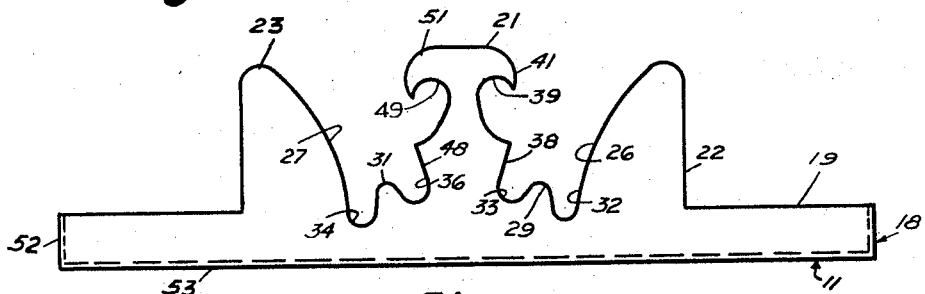
FIGURE 3 is a side view similar to FIGURE 1 showing details of construction.
Figure 4:
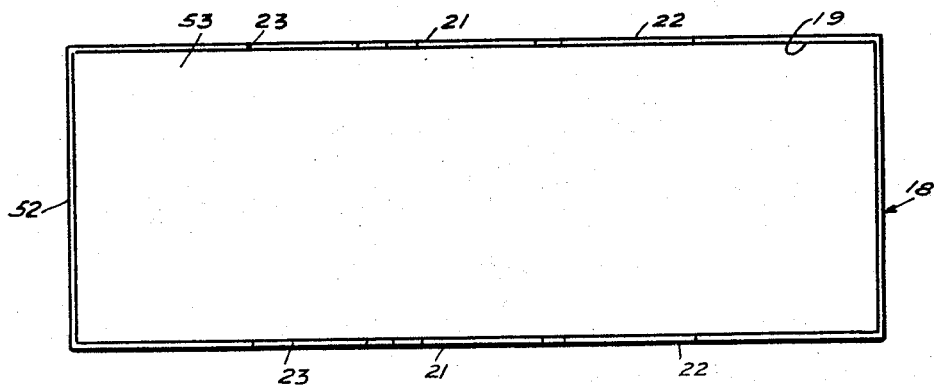
FIGURE 4 is a top view of the holder shown in FIGURE 3.

A modified form of the invention is shown in FIGURE 5. In general this construction is one half of the construction shown in FIGURES 1-4, and includes a base 61 having a pocket 62 for the reception of condensate, upstanding shoulder 63 and 64 defining a slot 66 for the reception of a lid, a boss 67 in the valley of the slot 66 defining recesses 68 and 69 for cradling the edge of a lid, and a recess 71 opening into the slot 66 and defining a shoulder 72. This construction differs from the embodiment described hereinbefore by only having one slot 66 for the reception of lids and having a pocket defined by a bottom 73 and an upstanding rim 74 around the bottom 73.

It is apparent that this lid holder may be readily formed from metal, wood or plastic, or it may be cast in ceramics or other material.

The manner in which the holder is used is readily apparent from the foregoing, but is summarized briefly hereinafter:

The holder is placed on top of the stove or work top adjacent the cooking area. Whenever the cook desires to remove the lid, which is usually very hot, the cook grasps the lid by the knob 20 and moves the lid from the cooking dish to the lid holder 11. In placing the hot lid in the holder the cook places the lid in both slots 26 on opposite sides of the body so that the lid generally overlies the holder in a balanced condition. The user urges the flange 16 into the recesses 32. Thereafter the user allows the lid to lean back on the shoulders 22. Engagement of the peripheral edge of the lid and the bosses 29 holds the lid in position. If a beaded edge is used, the lid may be placed on the holder so that the beaded edge is received in the recesses 39 and the lid rests on the shoulders 22. In this instance the shoulder 41 retains the lid in position.

As can be seen, the lid is held in a generally vertical position and overlies the pocket or reservoir 19. As a consequence, any moisture that forms on the lid is automatically drained into this reservoir and may be disposed of as desired. When the user desires to remove the lid it is only necessary to tilt the lid slightly away from the shoulder 22 and the lid may be readily removed.

This construction provides a holder for lids that is readily usable any place in the household and can be readily carried to any desired position. This holder is inexpensive to produce, is rugged and sturdy, makes a more efficient cooking operation, particularly where the hot lid or cover has to be removed for short periods of time, and eliminates dripping of condensate on the floor or other surfaces.

I claim:

In a relatively small compact portable device for supporting a lid having a peripheral edge either plain or beaded, the combination of a body of relatively narrow width having a pocket for reception of a liquid, spaced members on each side and forming the side of said body projecting above said body to be engageable with the lid at a position between the center of the lid and the outer edge to form a rest for the lid spaced shoulders spaced from said first spaced members to define upwardly facing slots on one side of said spaced members for receiving the peripheral edge of the lid and holding said lid against said rest whereby said lid is retained in a vertical position so as to drain condensate into said pocket, second spaced shoulders spaced from said first spaced members to define upwardly facing slots on the opposite side of said spaced member for receiving the peripheral edge of the lid and holding said lid against said rest whereby said lid is retained in a vertical position so as to drain condensate into said pocket each of said upwardly facing slots having a small projection in the bottom thereof to form cradles with the walls of the slots for the reception of the edge of the lid, said spaced members each having a portion removed adjacent the top to define a recess and a shoulder, said recess opening into the upwardly facing slots for the reception of a beaded edge of a lid, and said shoulder forming the upper edge of said recess to retain a lid in position, and said spaced shoulders and spaced members on each side of the body being in a common plane.

References Cited

UNITED STATES PATENTS

| D. 192,531 | 4/1962 | Guillaumont | 44—29 |
| 2,936,898 | 5/1960 | Miguez | 211—41 |
| 2,939,586 | 6/1960 | Dumaine | 211—41 |

FOREIGN PATENTS

| 76,243 | 8/1953 | Denmark. |

ROY D. FRAZIER, *Primary Examiner.*

CLAUDE A. LE ROY, *Examiner.*

K. J. WINGERT, *Assistant Examiner.*